United States Patent

Altermatt et al.

[15] 3,671,529

[45] June 20, 1972

[54] BASIC ANTHRAQUINONE DYES, WITH PYRIDINIUM 2- OR 4-DIMETHYLENE GROUP

[72] Inventors: Rudolf Altermatt, Tecknau, Basel-land; Roland Entschel, Basel; Curt Mueller, Binningen, Basel-land, all of Switzerland

[73] Assignee: Sandoz Ltd., Basel, Switzerland

[22] Filed: Aug. 20, 1969

[21] Appl. No.: 851,743

Related U.S. Application Data

[63] Continuation-in-part of Ser. No. 481,404, Aug. 20, 1965, Pat. No. 3,518,247.

[52] U.S. Cl. ............... 260/294.8 B, 260/250, 260/256.4 B, 260/283 S, 260/286 Q, 260/295 T, 260/296 T, 260/303, 260/307.5, 260/309, 260/309.2, 260/371, 260/373, 260/374, 260/378, 260/380, 260/381, 260/383

[51] Int. Cl. ...................................................... C07d 31/48
[58] Field of Search ............... 260/296 T, 295 T, 294.8 B

[56] References Cited

UNITED STATES PATENTS 3,431,285   3/1969   Schwander et al .................... 260/296

*Primary Examiner*—Alan L. Rotman
*Attorney*—Littlepage, Quaintance, Wray & Aisenberg

[57] ABSTRACT

Basic anthraquinone dyes free from sulphonic acid groups produced with a vinylpyridine group which are highly suitable for dyeing and printing acrylonitrile polymers or copolymers.

13 Claims, No Drawings

BASIC ANTHRAQUINONE DYES, WITH PYRIDINIUM 2- OR 4-DIMETHYLENE GROUP

The present application is a continuation-in-part of our copending application Ser. No. 481,404, filed on Aug. 20, 1965, now U.S. Pat. No. 3,518,247 and relates to basic anthraquinone dyes, their production and use.

These basic anthraquinone dyes are free from sulphonic acid groups and are of the formula $$\left[A\left(-y-\underset{R_1}{\overset{|}{C}}H-\underset{R_2}{\overset{|}{C}}H-\overset{}{C}\underset{\underset{}{\cup}}{\overset{\frown}{Z}}\right)_n\right]^{n\oplus} A^{\ominus} \quad (I)$$

where

A represents the residue of an anthraquinone dye that is free from sulphonic acid groups, $R_1$ represents a hydrogen atom or an alkyl radical which preferably contains one to four carbon atoms, $R_2$ represents a hydrogen atom or an alkyl radical which preferably contains one to four carbon atoms, y represents the direct bond or a bivalent radical, Z represents a member of a cyclic system of aromatic character consisting of several, preferably 5 or 6 members, which contains at least one quaternary nitrogen atom and may contain further hetero atoms and further substituents and which may be condensed with further cycloaliphatic, heterocyclic or aromatic rings, $n$ 1 or 2 and $A^{\ominus}$ is an anion.

According to the present process $n$ mol (s) of a compound of the formula $$\underset{R_1}{\overset{|}{C}}H=\underset{R_2}{\overset{|}{C}}-\overset{}{C}\underset{\underset{}{\cup}}{\overset{\frown}{Z_1}} \quad (III)$$

is/are added on to one mol of a compound of the formula $$B\left(-Y-H\right)_n \quad (II)$$

where B has the meaning given above for A or represents the residue of a compound capable of forming an anthraquinone dye residue A. In the above formula (III) $Z_1$ has the meaning given above for Z or it represents a member of a cyclic system of aromatic character consisting of several members, which contains at least one quaternizable nitrogen atom and may contain further hetero atoms and further substituents and which may be condensed with further cycloaliphatic, heterocyclic or aromatic rings, and when B in the reaction product represents the residue of a compound capable of forming an anthraquinone dye B is so converted and, if desired or required, the reaction product is quaternated. The quaternation and the conversion into a dye may be performed in either order of succession.

Compounds of the formula (III) are, for example: 2-vinylpyridines or 4-vinylpyridines; 4-vinylpyrimidine, 2-vinylquinoline, 1-vinylisoquinoline, 4-vinylquinoline, 3-vinylquinaldine, 2-vinylthiazole, 2-vinylbenzthiazole, 4-methyl-2-vinylthiazole; 4,5-dimethyl-2vinylthiazole, 4-phenyl-2-vinylthiazole, 4-methyl-2-(α-methylvinyl)-thiazole, 2-vinylbenzimidazole, 2-vinylbenzoxazole, 2-vinylimidazole, 1-methyl-2-vinylimidazole, 5-ethyl-2-vinylpyridine, 2-methyl-4-vinylthiazole, 2-propenylpyridine; 4-propenylpyridine, 2-propenylquinoline, 2-propenylpyrimidine, 4-propenyl-2-phenylquinoline, 2-methyl-5-vinylpyridine, 2-methyl-6-vinylpyridine and 2-vinylpyrazine.

The dye residue A of the aforementioned dyestuffs may contain additionally a cycloimmonium group or an external ammonium, isothiouronium or hydrazinium group.

Dyes that contain at least one of the aforementioned groups have been described, for example, in German specifications No. 1,011,396 and No. 1,044,023, in German Auslegeschrift No. 1,045,969, in Belgian specifications No. 630,895, No. 633,477, No. 638,438, No. 639,981 and No. 645,280, in French specification No. 1,325,176 and in French Patent of Addition No. 81,967 to French specification No. 1,325,176.

Compounds B may be those which contain a functional group or a group convertible thereinto or a reactive hydrogen atom, the said compound being reacted with a component used for synthesizing the anthraquinone dye residue A, for example by way of a condensation reaction.

Some of the new dyes or some intermediates suitable for forming these dyes can be obtained, for example, by first adding a compound of the formula (III) on to ammonia or a primary amine to form a compound of the formula $$R-NH-\underset{R_1}{\overset{|}{C}}H-\underset{R_2}{\overset{|}{C}}H-\overset{}{C}\underset{\underset{}{\cup}}{\overset{\frown}{Z_1}} \quad (IV)$$

where

R represents a hydrogen atom or a possibly substituted hydrocarbon residue, for example a possibly substituted alkyl, aryl (such as phenyl or naphthyl), aralkyl or cyclohexyl radical.

whereupon the resulting compound of the formula (IV) is reacted with a dye or dye intermediate containing reactive group, for example a group capable of condensation such, for example, as an $—SO_2Cl$, $—SO_2Br$, $—COCl$ or $—COBr$ group.

The aforementioned additive reaction may also be performed with salts of ammonia or of primary amines.

The symbol $A^{\ominus}$ may represent an organic or inorganic ion, for example methylsulphate, sulphate, disulphate, perchlorate, phosphotungstic molybdate, benzenesulphonate, 4-chlorobenzenesulphonate, oxalate, maleinate, acetate, propionate, methanesulphonate, chloroacetate, benzoate or complex anions, for example the anion of zinc chloride double salts.

Particularly suitable bridge members y are the atomic groupings:

$$-\underset{\underset{\text{hydrocarbon residue}}{|}}{N}-, \quad —NH—, \quad —O—, \quad —S—$$

possible linked through alkylene, alkenylene, aralkylene, arylene such, for example as $$—(CH_2)_p—O—, \quad —(CH_2)_p—S—, \quad (CH_2)_p—\underset{R_3}{\overset{|}{N}}—, \quad —(CH_2)_p—CO—\underset{R_3}{\overset{|}{N}}—$$

$$—SO_2—\underset{R_3}{\overset{|}{N}}—, \quad -\!\!\left\langle\;\right\rangle\!\!-\underset{R_3}{\overset{|}{N}}—, \quad -\!\!\left\langle\;\right\rangle\!\!-O—$$

where $p$ is a number from 0 to 3 and $R_3$ represents a hydrogen atom or a lower unsubstituted or substituted alkyl radical or an unsubstituted or substituted aryl or acyl radical.

Possibly substituted hydrocarbon residues are possibly substituted alkyl, phenyl, naphthyl or cycloalkyl radicals such, for example, as methyl, ethyl, propyl, butyl, hydroxyethyl, chloroethyl, cyanethyl, cyclohexyl and the like.

Preferred acyl radicals correspond to the formula $$R_4—SO_2— \text{ or } R_4—CO—,$$

where $R_4$ represents hydrogen or an aromatic or a saturated or unsaturated aliphatic or cycloaliphatic residue.

Suitable acyl radicals are, for example, formyl, acetyl, propionyl, butyryl, acryloyl, cyanoacetyl, dimethylaminoacetyl, methylsulphonyl or a possibly substituted phenylsulphonyl group.

Alkylating agents suitable for the quaternation of the hetero ring $$-\overset{}{C}\underset{\underset{}{\cup}}{\overset{\frown}{Z_1}}$$

are, for example, esters of strong mineral acids and of organic sulphonic acids, such as alkylchlorides, alkylbromides and alkyliodides or alkylsulphates, such, for example, as methyl iodide, methyl bromide, methyl chloride, dimethyl sulphate, aralkyl halides; α-halogenated esters of lower alkanesulphonic acids, such, for example, as methanesulphonic, ethanesulphonic or butanesulphonic acid; and esters of benzenesulphonic acids which may be further substituted, such as methyl, ethyl, propyl and n-butyl esters of benzenesulphonic acid, of 2- or 4-methylbenzenesulphonic acid, 4-chlorobenzenesulphonic acid or 3- or 4-nitrobenzenesulphonic acids. Alkylation is preferably performed in an inert solvent or alternatively in an aqueous suspension, or in the absence of a solvent in an excess of the alkylating agent at a temperature above −10° C, and, if desired, in a buffered medium. The reaction of a compound of the formula (II) with a compound of the formula (III) is advantageously performed, if desired or required, in the heterogeneous liquid phase in the presence of a catalyst, for example of a saturated fatty acid containing one to about five carbon atoms, such as formic, acetic, propionic, butyric or isobutyric acid; their alkyl esters such as ethyl acetate or ethyl propionate; their anhydrides such as acetic or propionic anhydride, or their heavy-metal salts, such as copper, zinc, cobalt or nickel formate or acetate; of a polyol such as glycerol; a glycol such as ethyleneglycol; a phenol itself, metacresol or para-cresol or a cresol mixture; of an alcohol; or of a salt of a strong acid with an amine or ammonia, for example ammonium chloride, or aniline hydrochloride; in certain cases even water may act as a catalyst. When both compounds (II) and (III) are, at the reaction temperature, liquid or capable of dissolving or liquefying each other, the process may be performed without a solvent in the presence of 0.1 percent of catalyst, or a solvent may be used additionally. Suitable solvents are the aforementioned catalysts, provided they are liquid and do not cause any side reaction, for example an acylation of an amino group, as well as inert solvents, such as aromatic hydrocarbons which may contain halogen atoms or nitro or alkoxy groups. When solid starting materials are used, a solvent is, in most cases, absolutely necessary to ensure smooth progress of the reaction. Suitable temperatures are within the range from about 50° to 150° C, preferably from about 80° to 130° C; they depend on the reactivity of the reactants and on the catalyst used. When acetic acid of 100 percent strength is used, the most favorable temperature range is from 100° to 120° C, the reaction taking a few hours under these conditions.

The resulting dyes or intermediates can be isolated and, if necessary purified, by conventional basic operations, such as evaporation, precipitation, distillation, filtration, decantation or the like; if they are obtained in a sufficiently pure form, they can be used as they are.

The group of, formula

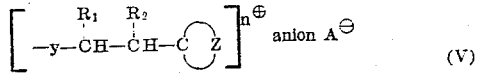

(V)

may be present in the α-and/or β-position of the anthraquinone residue.

The preferred substituents in the anthraquinone compounds are those which are usual in dyes for acetate and polyester fibers, namely: hydroxyl, halogen, such as chlorine, bromine and fluorine; the nitrile or nitro group; possibly substituted alkyl; alkylsulphonyl; sulphonamide; carbalkoxy; carboxylic acid amide; alkoxy or carbalkoxy groups, also the carboxylic acid group and esters of the carboxylic acid and sulphonic acid group, and the like.

As examples of anthraquinone dyes there may be mentioned: 1-amino- or 1-alkylamino- or 1-arylamino-4-arylaminoanthraquinones, 1-amino-2-aryloxy- or -2-alkoxy-4-aryl- or -4-alkylaminoanthraquinones, in which the anthraquinone and/or the alkylamino or arylamino residue, e.g., the phenylamino or naphthylamino residue, may carry further substituents, e.g. possibly substituted alkyl; alkoxy; hydroxyl; halogen, such as chlorine, bromine or fluorine; nitro sulphonamine; sulphone; alkylsulphonyl; azoamino or acylamino; cyclohexyl or cyclohexylamino or similar groupings.

In the anthraquinone compounds the grouping of formula (V) may be attached to the anthraquinone molecule, for example, through a nuclear-bound amino group, for example

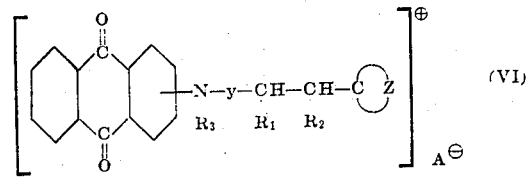

or through a phenylamino group, for example

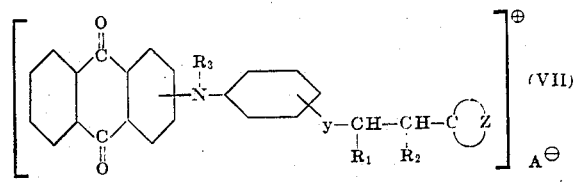

Alternatively, the grouping of formula (V) may be bound to the anthraquinone molecule, for example, as follows:

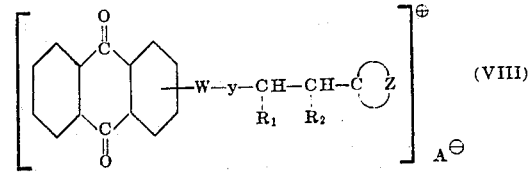

or

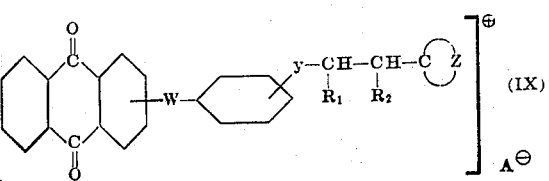

where W stands for —O— or —S—. Good dyes are of the formula

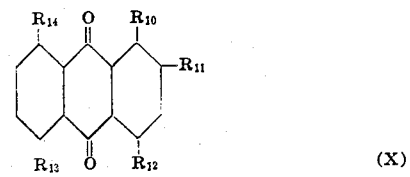

in which $R_{10}$ stands for

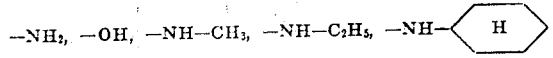

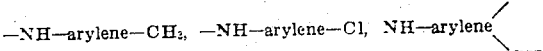

or —NH—T $R_{11}$ stands for

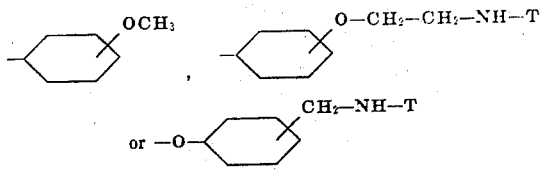

$R_{12}$ stands for

—OH, —NH—CH$_3$, —NH—aryl, —NH—T

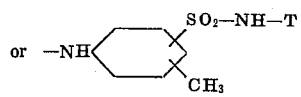

$R_{13}$ stands for

H, —NH$_2$, —OH, —NH—aryl, or —NH—T and $R_{14}$ stands for

H, —OH or —NH—aryl, where T represents a group of the formula

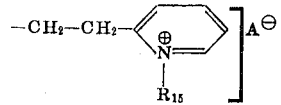 (XI)

or

—CH$_2$—CH$_2$—⟨⊕N—R$_{15}$⟩A$^\ominus$ (XII)

where $R_{15}$ stands for a low molecular alkyl radical, which may be substituted, and contains one to six or, preferably one to four carbon atoms, e.g. —CH$_3$, —C$_2$H$_5$, —C$_2$H$_4$-OH, —CH$_2$CHOH—CH$_3$ or —C$_2$H$_4$—CO—NH$_2$, and A$^\ominus$ for an anion:

and where the dye of formula (X) contains one group of formula (XI) or (XII).

Equally good dyes are of formula (X) or formula (XIII), respectively, where the aryl or arylene in formula (X) stands for a phenyl or a phenylene radical.

Especially good dyes are of the formula

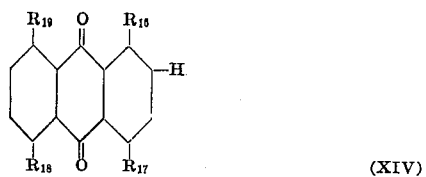 (XIV)

in which $R_{16}$ stands for

—OH, —NH—CH$_3$, —NH—⟨phenyl-(CH$_3$)$_2$⟩

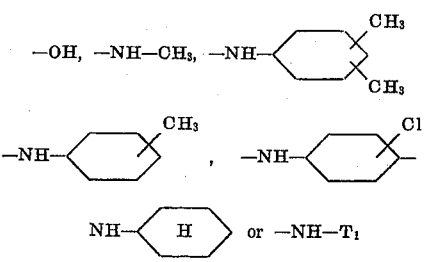

NH—⟨H⟩ or —NH—T$_1$ $R_{17}$ stands for

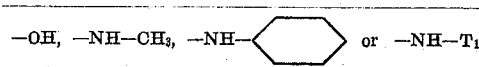

$R_{18}$ stands for

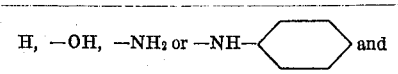

$R_{19}$ stands for

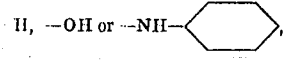

where T$_1$ represents a group of formula

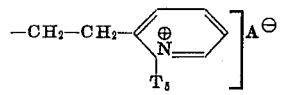 (XV)

or

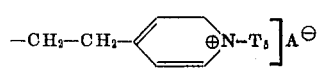 (XVI)

where T$_5$ stands for

—CH$_3$ or C$_2$H$_5$;

and where the dye of Formula (XIV) contains one group of Formula (XV) or (XVI).

Equally good dyes are of the formula

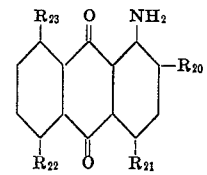 (XVII)

where $R_{20}$ stands for

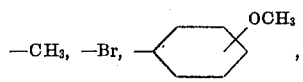

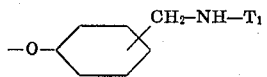 or 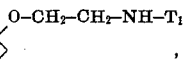, $R_{21}$ stands for

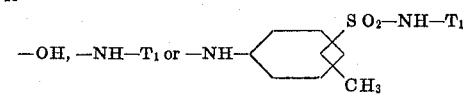

$R_{22}$ stands for

H, —NH$_2$ or —NH—T$_1$ $R_{23}$ stands for

H or —OH, where T$_1$ stands for a group of Formula (XV) or (XVI) and where the dye of Formula (XVII) contains one group of Formula (XV) or (XVI).

The new anthraquinone dyes are used primarily for dyeing, padding or printing fibers, filaments or textile materials made therefrom, which consist of or contain acrylonitrile polymers or copolymers. The dyeings obtained are deep, have good fastness to light and wet treatments with especially good fastness to washing, perspiration, sublimation, pleating, decatising, ironing, water, sea water, dry cleaning, cross-dyeing and solvents. In addition, they display good stability in the presence of salt and are readily soluble, especially in water.

The term "acrylonitrile polymers" denotes all such polymers which contain more than 80 percent of acrylonitrile. Acrylonitrile copolymers normally consist of 80 to 95 percent of acrylonitrile and 20 to 5 percent of vinyl acetate, vinyl pyridine, vinyl chloride, acrylic acid, acrylic acid esters, methacrylic acid, methacrylic acid esters or the like.

The aforementioned fibers can be dyed in mixture with others. In general, dyeing is carried out in an aqueous alkaline, neutral or acidic medium at temperatures of 80° to 100°C, advantageously at the boil, or at temperatures above 100°C under superatmospheric pressure.

The dyeings obtained by the present process are very level, even when no retarder is used. Blend fabrics containing a component of polyacrylonitrile fiber are also well suited to dyeing by the present process. The dyes of the above definitions are also suitable for the mass dyeing of polyacrylonitrile in shades fast to light and wet treatments, and for the coloration of oils, paints, plastics and spun dyed filaments, as well as polyesters or polyolefines modified by acid groups. The new dyes may further be used for dyeing cotton, wool, silk, cellulosic fibers, polyamide fibers and paper at any stage of manufacture, as well as leather. It has been found advantageous to use mixtures of two or more dyestuffs of formula (I).

In the following Examples the parts and percentages are by weight.

EXAMPLE 1

Three hundred and ten Parts of 1-amino-4-methylaminoanthraquinone are added to a solution of 150 parts of 2-vinylpyridine in 500 parts of glacial acetic acid, and the resulting suspension is heated to 120° C and stirred for 6 hours at 120° C.

When the reaction is complete, the batch is allowed to cool to 30° C and diluted with 1,000 parts of water. The precipitated dye is filtered off, washed with cold water and dried. For quaternation 10 parts of the dry dye are pasted in 40 parts of dimethylformamide, 3.7 parts of dimethylsulphate are added, and the mixture is stirred for 20 hours at 40° C and then poured into 500 parts of water. The resulting solution is clarified by filtration and the dye salted out with 25 parts of sodium chloride, filtered off and dried. It dyes polyacrylonitrile fibers in level blue shades with good fastness properties.

EXAMPLE 2

A suspension of 86 parts of 1-methylamine-4-(4'-aminophenylamino)-anthraquinone in 200 parts of glacial acetic acid is heated to 80° C, and at this temperature 52 parts of 2-vinylpyridine are dropped in within 3 hours. When the additive reaction is complete — which can be verified by chromatography — the reaction mixture is diluted with a solution of 200 parts of glacial acetic acid in 400 parts of water, and at 30° C the precipitated dye of the formula

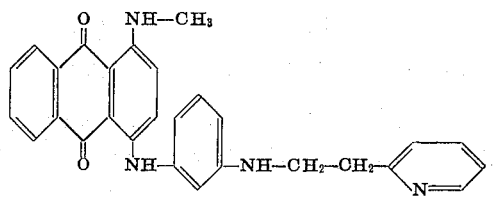

is suctioned off, washed with cold water and dried. The dye is quaternated as described in Example 1; on polyacrylonitrile fibers it gives fast dyeings of greenish blue shade.

DYEING EXAMPLE 20 parts of the dye obtained as described in Example 1 are intimately mixed with 80 parts of dextrin for 48 hours in a ball mill. One part of the resulting preparation is pasted with 1 part of a 40 percent acetic acid solution, the magma is covered with 400 parts of distilled water heated at 60° C while being continuously agitated, and the whole is boiled for a short time. It is diluted with 7,600 parts of distilled water, 2 parts of glacial acetic acid are added, 100 parts of polyacrylonitrile fabric then are entered into this dyebath at 60° C. (The polyacrylonitrile fabric had been pretreated for 10 to 15 minutes at 60° C in a bath of 8,000 parts of water and 2 parts of glacial acetic acid). The bath is raised over 30 minutes to 100° C and held at the boil for 1 hour. The fabric is then rinsed. The resulting level blue dyeing has good fastness properties.

EXAMPLE 3

In 50 parts of acetic acid 31.4 parts of 1-amino-4-phenyl-aminoanthraquinone are entered, followed by 18 parts of 2-vinylpyridine. The reaction is conducted for 12 hours at 110° C with constant stirring. Subsequently 100 parts of water are run into the mixture, at which point the product settles out. It is filtered off, washed with water until neutral and dried. For quaternation, 15 parts of the dried reaction product are dissolved in 150 parts of nitrobenzene at 60° C, 4 parts of dimethylsulphate are added and the solution is stirred until the chromatogram indicates that the reaction is complete. On continued stirring in the cold the dye settles out. It is filtered off, washed with toluene and dried at 60° C in a vacuum drying cabinet.

On fabrics of polyacrylonitrile fiber this dye produces greenish blue dyeings which show outstandingly good all-round fastness.

EXAMPLE 4

Twenty four parts of 1-amino-4-hydroxyanthraquinone and 18 parts of 2-vinylpyridine are reacted in 10 parts of acetic acid for 12 hours at 110° C with stirring. By careful dropwise addition of water the product is precipitated in a well filterable form. After washing for neutralization and drying, 15 parts of the product are quaternated with 4 parts of dimethyl sulphate in 100 parts of nitrobenzene at 60° C.

On polyacrylonitrile fibers this dye gives dyeings of brilliant violet shade which have notably good light and wet fastness.

EXAMPLE 5

A suspension of 34.6 parts of 1-amino-4,5-dihydroxy-8-phenylaminoanthraquinone in 180 parts of acetic acid is prepared at 110° C, in which 25 parts of 2-vinylpyridine are entered. The reaction mixture is maintained for 20 hours at 110° C with stirring, until a chromatogram indicates the endpoint of the reaction. The product is precipitated by slow dropwise addition of 250 parts of 30 percent acetic acid and is then filtered off, washed until of neutral reaction and dried.

Subsequently it is reacted with dimethyl sulphate to the quaternated dye, which dyes polyacrylonitrile fabrics in blue shades of very good all-round fastness.

The following table lists further dyes of this invention which are produced in accordance with Examples 1 to 5; they correspond to the general formula

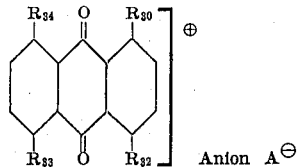

where the symbols $R_{30}$ to $R_{34}$ have the meanings shown in the table. The anion $A^{\ominus}$ may be anyone of those mentioned in the specification. The symbols $T_{10}$ and $T_{11}$ appearing in the following table signify:

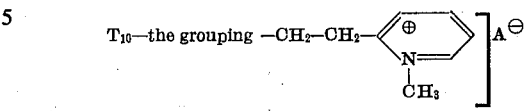

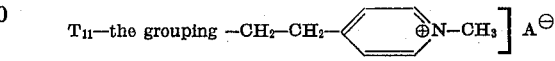

In each example shown in the table the residue $T_{10}$ may be replaced by $T_{11}$ and vice versa.

TABLE

| Ex. No. | $R_{30}$ | $R_{31}$ | $R_{32}$ | $R_{33}$ | $R_{34}$ | Shade obtained on polyacrylonitrile fibres |
|---|---|---|---|---|---|---|
| 6 | HN—⟨⟩—CH$_3$ | H | HN—T$_{10}$ | H | H | Greenish blue. |
| 7 | NH—⟨⟩—Cl | H | HN—T$_{11}$ | H | H | Do. |

TABLE

| Ex. No. | R30 | R31 | R32 | R33 | R34 | Shade obtained on polyacrylonitrile fibres |
|---|---|---|---|---|---|---|
| 8 | HN—⌬(CH3)(CH3) | H | HN—T10 | H | H | Do. |
| 9 | NH2 | Br | HN—T10 | H | H | Reddish blue. |
| 10 | NH2 | CH3 | HN—T11 | H | H | Do. |
| 11 | OH | H | HN—T10 | HN—⌬ | HN—⌬ | Green. |
| 12 | OH | H | HN—T10 | OH | NH2 | Blue. |
| 13 | HN—CH3 | H | HN—⌬—NH—T10 | H | H | Greenish blue. |
| 14 | NH2 | O—⌬—CH2NH—T10 | OH | H | H | Red. |
| 15 | NH2 | CH3 | HN—⌬(SO2NH—T10)(CH3) | H | H | Reddish blue. |
| 16 | NH2 | ⌬—OCH3 | OH | HN—T10 | OH | Blue. |
| 17 | NH2 | ⌬—OCH2CH2—NH—T10 | OH | H | OH | Do. |
| 18 | NH—⌬H | H | NH—T11 | H | H | Reddish blue. |
| 19 | NH2 | OCH2CH3 | NH—T10 | H | H | Do. |
| 20 | NH2 | OCH2CH2—NH—T10 | OH | H | H | Red. |
| 21 | NH—(naphthyl) | H | NH—T11 | H | H | Blue. |
| 22 | NH—T10 | H | OH | NH—(naphthyl) | OH | Do. |
| 23 | NHC2H5 | H | NH—T11 | H | H | Reddish blue. |

The formulas of representative dyes disclosed in the foregoing examples are as follows:

EXAMPLE 1

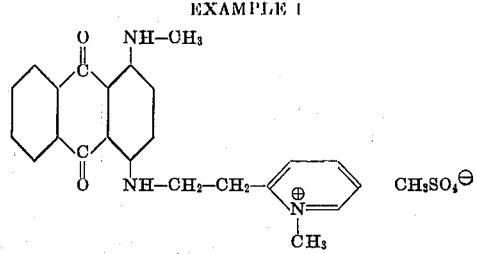

EXAMPLE 3

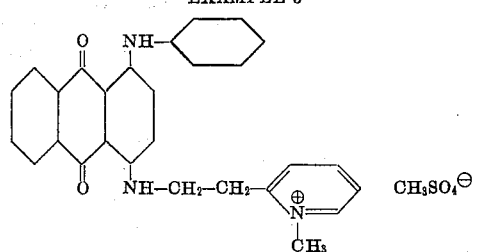

EXAMPLE 4

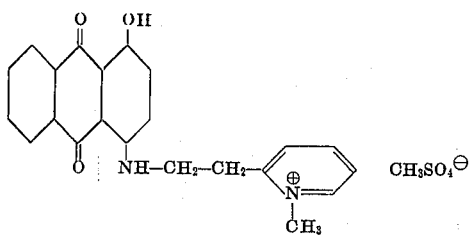

EXAMPLE 7

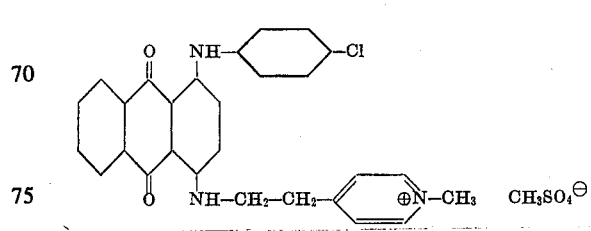

EXAMPLE 18

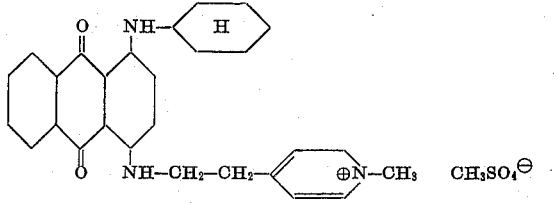

Having thus disclosed the invention what we claim is:

1. Basic anthraquinone dye free from sulphonic acid groups and containing in its molecular structure 2- or 4-dimethylene-N-(lower)alkylpyridinium, the dimethylene of which is bound to the anthraquinone nucleus through an amino nitrogen and the lower alkyl of which is substituted or unsubstituted, any substituent of substituted lower alkyl being a member selected from the group consisting of —OH and —CO—NH$_2$.

2. Basic anthraquinone dye according to claim 1 wherein the dimethylenepyridinium is 2-dimethylene-N-methyl-pyridinium.

3. Basic anthraquinone dye according to claim 1 wherein the dimethylenepyridinium is 4-dimethylene-N-methyl-pyridinium.

4. Basic α-aminoanthraquinone dye according to claim 1 wherein the α-amino nitrogen is bound directly to the dimethylene of the dimethylenepyridinium.

5. Basic dye according to claim 4 substituted in the 1-position by a member selected from the group consisting of methylamino, anilino, chloroanilino, cyclohexylamino and hydroxy and in the 4-position by said α-amino nitrogen.

6. Basic anthraquinone dye of claim 1 free from sulphonic acid groups and of the formula

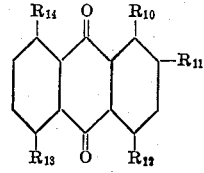

in which
R$_{10}$ is a member selected from the group consisting of —NH$_2$, —OH, —NH-CH$_3$, —NH—C$_2$H$_5$, cyclohexylamino, toluidino, xylidino and chloroanilino;
R$_{11}$ is a member selected from the group consisting of -H, bromo, methyl, ethoxy and methoxyphenyl;
R$_{12}$ is
R$_{13}$ is a member selected from the group consisting of —H, —NH$_2$, —OH and anilino;
R$_{14}$ is a member selected from the group consisting of —H, —OH and anilino;
T is a member selected from the group consisting of 2-dimethylene-N-(lower)alkylpyridinium and 4-dimethylene-N-(lower)alkylpyridinium and A$^\ominus$ is an acid anion 7. Basic anthraquinone dye of claim 6 wherein R$_{11}$ is —H.

8. Basic anthraquinone dye of claim 7 wherein each of R$_{13}$ and R$_{14}$ is —H.

9. The basic anthraquinone dye according to claim 5 and of the formula

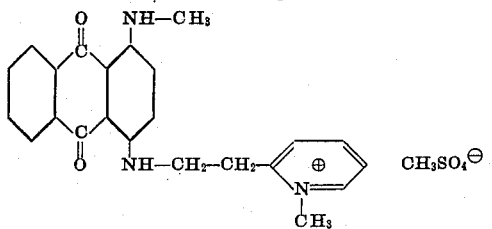

10. The basic anthraquinone dye according to claim 5 and of the formula

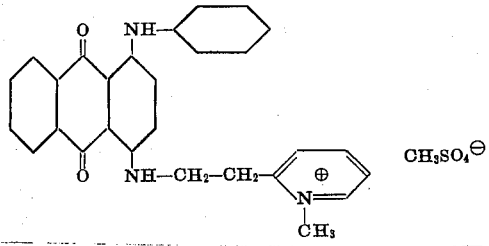

11. The basic anthraquinone dye according to claim 5 and of the formula

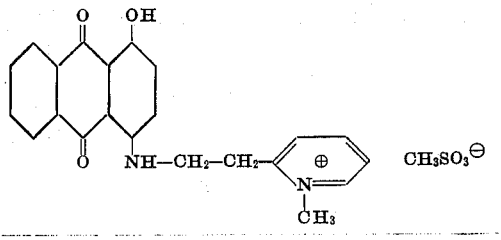

12. The basic anthraquinone dye according to claim 5 and of the formula

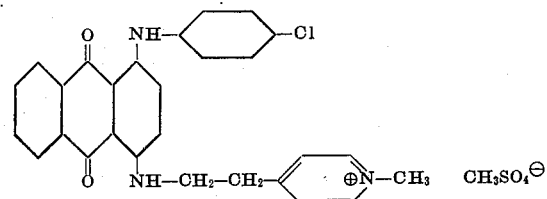

13. The basic anthraquinone dye according to claim 5 and of the formula

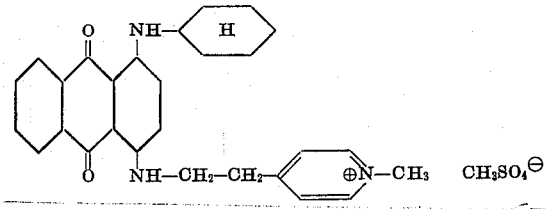

* * * * *